March 15, 1960     F. KNOTH     2,928,175
INTERCHANGEABLE ARTICULATOR
Filed June 24, 1957     2 Sheets-Sheet 1
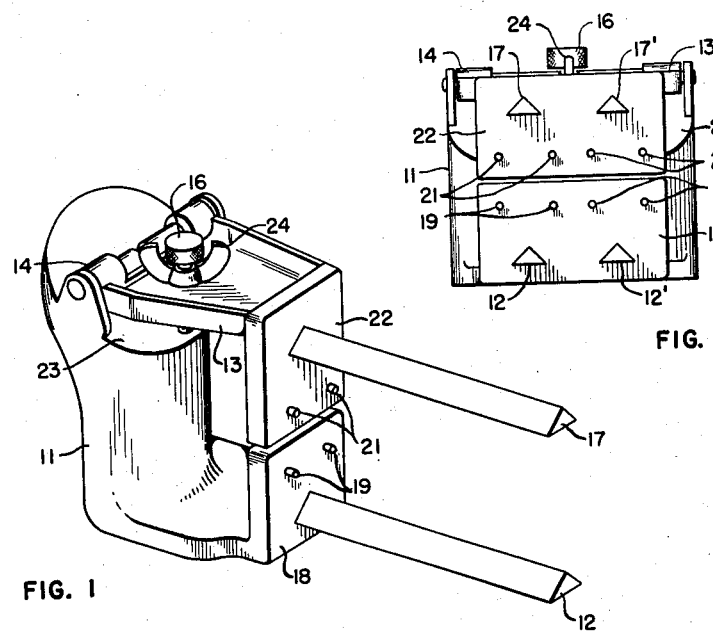
INVENTOR
FRED KNOTH March 15, 1960  F. KNOTH  2,928,175
INTERCHANGEABLE ARTICULATOR
Filed June 24, 1957  2 Sheets-Sheet 2

INVENTOR
FRED KNOTH
BY
ATTORNEYS

United States Patent Office 2,928,175
Patented Mar. 15, 1960

2,928,175

INTERCHANGEABLE ARTICULATOR

Fred Knoth, Chicago, Ill.

Application June 24, 1957, Serial No. 667,465

5 Claims. (Cl. 32—32)

My present invention relates to the art of dental restoration and more particularly to an articulator and a method for matching dental models and securing them on the articulator whereby the relative position of the upper and lower dental models will remain constant.

In the art of dental restoration, an articulator is used for aligning the dental models to be duplicated in the same bite and chewing relationship as the original teeth. It is necessary, therefore, that the articulator be movable to simulate as nearly as possible the action of the jaws, and that the dental models be positioned on the upper and lower portion of the articulator so as to be in the same relationship to one another on the articulator as the teeth are in the patient's mouth.

In order to maintain the relative positions of the upper and lower dental models while the technician or dentist works on them, the models must be secured to the corresponding upper and lower parts of the articulator in predetermined positions which must remain constant throughout the various operations that might be involved in working on the models. This, of course, means that the models must either be immovably fixed to the articulator and remain so fixed until the entire operation is completed, or that provision must be made for removably positioning the models on the articulator in a manner which assures assumption of the same relative position of the models on the articulator each time that they are removed and repositioned thereon. The latter, that is, ready removability and replaceability of model on articulator is, of course, preferable because it obviates the need of a multiplicity of expensive articulators in a dental laboratory where there may be a number of such restorations going on at any given time.

It is an object of this invention to provide an articulator which permits positioning and removal of dental models therewith without altering the relative position between such models.

It is another object of this invention to provide means as part of the model, for cooperation with the articulator to assure positive positioning.

Another object of my invention is to provide positioning means secured in the dental model which will permit positioning and removal of the model without deterioration of the model or the cast thereon.

A still further object of my invention is to provide a method of molding removable dental models which will withstand the wear of being positioned, removed, and repositioned on an articulator without affecting the accuracy of the relative position of the model.

These and other objects and advantages of my invention will be apparent to one skilled in the art from the following detailed description when taken in conjunction with the drawings wherein:

Figure 1 is a perspective view of a preferred embodiment of the articulator of my invention;

Figure 2 is a side elevational view of the articulator shown in Figure 1;

Figure 3 is a sectional view of the articulator shown in Figure 1 taken along the line 3—3 of Figure 2, looking in the direction of the arrows;

Figure 8 is a front elevational view of a preferred form of my invention when used for full dental molds having two positioning sleeves molded in each of the upper and the lower molds.

Figures 4, 5:
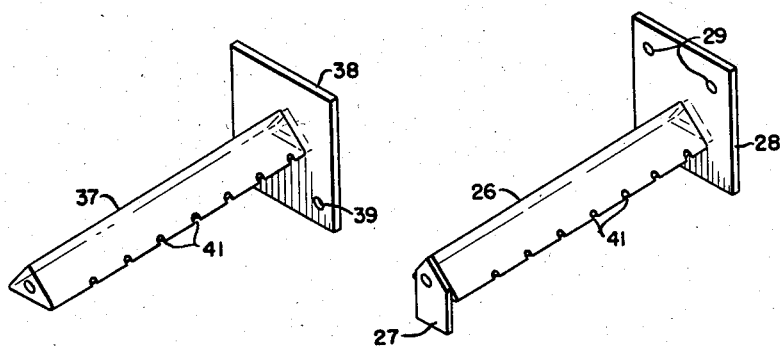
Figure 4 is a perspective of a preferred embodiment of the mold sleeve to be used in practicing my invention.
Figure 5 is a preferred embodiment of the lower mold sleeve to be used in practicing my invention.

In making a dental restoration, an impression is first made of the natural teeth by means of wax or any other suitable plastic material. The impression is mounted on a plate such as the plate shown in Figure 6. Into this impression, which is actually a negative of the teeth, artificial stone or plaster is introduced. The stone or plaster is introduced slowly and accompanied by vibration to insure that it gets into the crevices and indentations of the impression, and also to eliminate the presence of any air bubbles. This mold is then united with a cast of investment material and with a positioning member on the molded dental model to provide reinforced strength. As used in this application, I intend that the term investment material shall mean such products as plaster, artificial stone or any other moldable material which may be suitable for making dental models or casts.

In the past, one method has been to position the upper dental model adjacent to the upper jaw of an articulator and to then fill in the space between the model and the upper jaw with plaster or other investment material to encompass a portion of the upper jaw, and thereby secure the upper dental model in a permanent position on the articulator. After the plaster cast was built up to secure the upper jaw in a permanent position, the lower dental model was then positioned in the desired relationship to the upper dental model and secured there while plaster was filled in, to permanently secure the lower dental model to the lower jaw of the articulator in the desired relationship to the upper model. It is apparent that with such a method of securing the dental model to the articulator, the particular articulator could be used only with the set of models which were secured thereto, and was therefor unavailable for use with the other dental models until the first set of models is no longer needed. If either the upper or lower models were removed from the articulator, the painstaking job of repositioning them on the articulator had to be repeated at the cost of considerable time and effort on the part of the laboratory technician or dentist.

In general, my invention contemplates a cooperative combination of articulator and dental models, the articulator having at least one extension bar protruding from the upper jaw portion and at least one extension bar protruding from the lower jaw portion, and the upper and lower dental models having, integrally therewith, a sleeve member for slidably positioning the models on the bar portion of the articulator without permitting rotation on the said bar portions.

In using my new and improved articulator and method of mounting dental models thereon, a plastic sleeve is poured right into the lower model, the plastic sleeve being cooperable with a triangular extension bar, in the embodiment shown in Figures 1, 2, and 3, to be slidably but not rotatably positioned thereon in a predetermined position.

After the lower dental model has been prepared with the positioning sleeve in place, it is positioned on the lower extension bar of the articulator. The upper model is then mounted onto the lower model according to the bite and an upper mold sleeve is slipped onto the upper extension bar of the articulator and brought to rest adjacent to the upper model. Investment material is then poured over the sleeve in the top of the upper model, thereby embedding the sleeve in the model in a position which guarantees the proper positioning of the upper model relative to the lower model so long as the mold sleeves are on the articulator extension bars. By making all articulators of this type with a standard extension bar and with the upper extension bar in the same relative position to the lower extension bar on all articulators, it is apparent that a dental mold prepared in the foregoing manner can be utilized with an articulator of the type described.

My invention is applicable to the modifications of any of the variously hinged articulators which are now on the market. The articulator of my invention differs from all others in the mounting, or fixing, of the upper and lower models on the articulator, as will be seen from the drawings. In the drawings, I have represented, in Figures 1, 2, and 3, an articulator having a base portion 11 equipped with a lower extension bar 12 and an upper hinged portion 13 which is hinged in any suitable manner, as represented at 14, and has thereon an adjustment screw 16 for adjustably controlling the vertical position of the upper extension bar 17.

A positioning plate 18 is rigidly secured to the base 11 and has the extension bar 12 rigidly secured to and protruding from its surface. The lower positioning plate 18 also has two positioning pegs 19 for cooperation with the corresponding apertures in a flange of the sleeve mold for more positively positioning the lower dental model on the extension bar 12. An upper positioning plate 22 is rigidly secured in any suitable manner to the hinge bracket 13 and has an extension bar 17 secured to its face and protruding substantially parallel to the lower extension bar 12 when the upper positioning plate 22 is in its normal rest position. By manufacturing all articulators of this type with the two positioning plates 18 and 22 in the same relative position, any articulator of this type may be utilized with a dental mold formed according to my invention.

Figure 6:
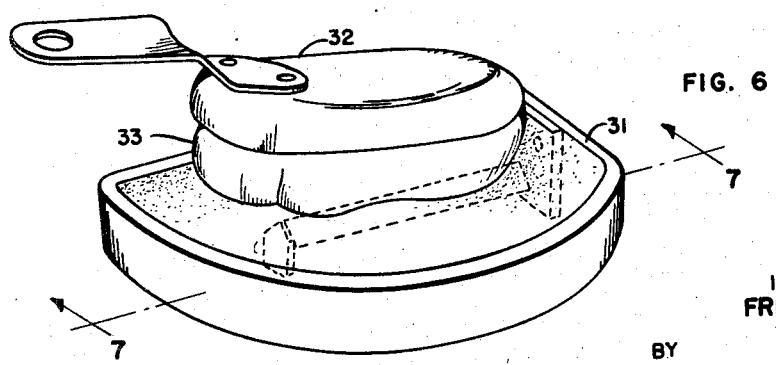
Figure 6 represents a method of forming the lower dental mold for use with my invention.

In the practice of my invention, a wax impression, represented at 33 in Figure 6, is placed upon a tray 32, and an artificial stone or plaster is molded therein to form the dental model for the lower portion. In the illustration of my invention, I am utilizing a pair of models representative of the left half of a person's upper and lower teeth. It will, of course, be understood that the same principles can be applied to a full dental mold or model by utilizing the articulator illustrated in Figure 8 and placing the positioning sleeves a predetermined distance apart to correspond with the distance between the extension bars 12 and 12'.

Figure 7:
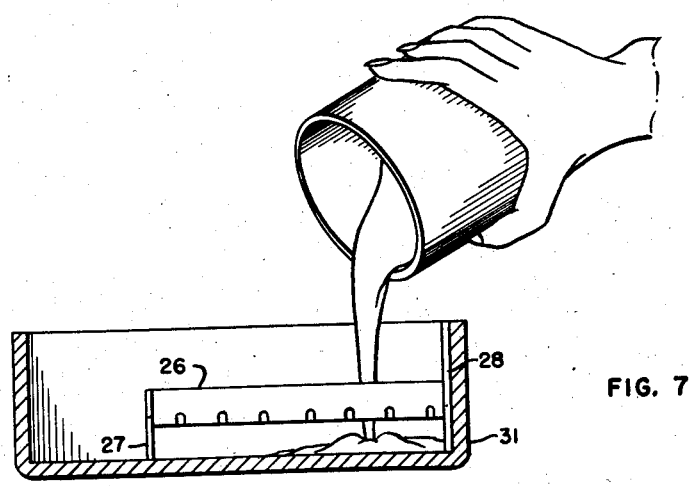
Figure 7 is a sectional view taken along the line 7—7 of Figure 6 representing the pouring of investment material into the lower mold with the positioning sleeve in place.

While the artificial stone or plaster in the impression mold is hardening, a lower mold positioning sleeve, an example of which is illustrated in Figure 5, is positioned in the mold 31 shown in Figure 6 and Figure 7. The sleeve 26 is positioned within the mold and held away from the floor of the mold by virtue of the plate or flange 28 and the elevating tab 27 resting on the floor of the mold, so that the plaster or investment material may be poured into the mold and completely surround the sleeve 26. The mold is filled by pouring plaster into the mold around the sleeve 26 and when the plaster in the mold 31 and the artificial stone or plaster in the mold 33 are of proper consistency to adhere to one another, the impression in the mold 33 is united with the cast in the mold 31 to form a dental model such as is shown at 36 in Figure 2.

After the dental model, as thus formed, has hardened to a proper consistency, it is removed from the mold 31 and placed on the lower extension bar 12, by slidably positioning the sleeve 26 on the bar 12, the positioning pegs 19 of the lower positioning plate 18 cooperate with the apertures 29 in the plastic flange 28 on the mold sleeve 26 to assure that the mold is positively positioned thereon, and that the lower model 36 will assume that exact position each time that it is placed on an articulator of this type by slidably engaging the extension bar 12 with the embedded sleeve 26.

With the lower dental model in place on the articulator, the upper model is positioned thereon in accordance with the measurements taken from the patient's mouth so that it is in proper relative position to the lower model 33. After the upper model 33' has been thus positioned, it is held in place and an upper model sleeve, as illustrated in Figure 4, is positioned on the upper extension bar 17, with the positioning pegs 21 on the positioning plate 22 cooperating with the apertures 39 in the plastic flange 38 on the sleeve 37 to hold it securely in place thereon. The bracket 13 is then swung down so as to position the bar 17, and therewith the sleeve 37, in the proximity of the upper model 33'. With the upper extension bar 17 and the mold sleeve 37 in place, plaster is formed around the sleeves and united to the upper model 33' to form a cast 36' with the upper model 33' being properly positioned relative to the lower model 33, so long as the cast shall remain intact.

With the positioning sleeves 26 and 27 in place, the models 36 and 36' can be slipped off of the articulator and returned thereto at will. The sleeves 37 and 26 being of a plastic or other durable material, there is no danger of the aperture or passageway in the cast being enlarged or chipped so as to nullify the positioning effect of the extension bars 12 and 17. While I have illustrated the extension bars 12 and 17 as being triangular in cross-section, it will of course be apparent to those skilled in the art that any non-circular shape, such as a rectangle, hexagon or ellipse, can be utilized.

The walls of the positioning sleeves are illustrated in the preferred embodiment of my invention as having a series of notches 41 therein. The purpose of the notches 41 is to assure proper engagement between the plaster cast and the sleeve to prevent movement of the sleeve within the cast, which would affect the ultimate accuracy of the positioning of the cast on the extension bars. It will be recognized by those skilled in the art that any other method of securing positive adherence between the sleeve and the cast might be utilized. This means may take the form of lateral extensions such as discs or spines or any other convenient and well-known manner of attaining the aforementioned objectives.

While I have shown and described certain preferred embodiments of my present invention, it will be understood by those skilled in the art that various rearrangements and modifications may be made therein without departing from the spirit and scope of my invention as defined in the appended claims.

I claim:

1. A method for removably orienting two dental models comprising the steps of securing a first and second elongated member in a fixed relative position, molding a cast of investment material around a sleeve of durable material, uniting a first dental model with said cast, engaging said sleeve with said first elongated member for positioning said cast, engaging a second sleeve with said second elongated member, placing a second dental model in a predetermined position relative to said first dental model, applying sufficient investment material to said dental model to unite said model with said second sleeve, and allowing said investment material to set before disengaging said sleeve from said elongated member.

2. A dental articulator comprising a pair of members mounted to permit relative movement simulating that of the jaws and each having means for removably supporting a pair of dental model bearing casts in a desired oriented relation, said means embodying a pair of positioning plates one affixed to each said member, an extension bar of non-circular cross-section affixed to each said positioning plate and protruding outwardly therefrom, and mounting sleeves which may be embedded in the material forming the casts which support each dental model, said sleeves having a passage therein opening through one end which conforms to the shape of one of said extension bars, and said sleeves removably fitting about said extension bars in non-rotatable relation therewith.

3. A dental articulator comprising a pair of members mounted to permit relative movement simulating that of the jaws and each having means for removably supporting a pair of dental models in a desired oriented relation, said means embodying a pair of positioning plates one affixed to each member, a pair of extension bars of non-circular cross-section, one affixed to each positioning plate and protruding outwardly therefrom, and sleeves to which dental models may be affixed, said sleeves each having a passage therein opening through one end which conforms to the shape of one of said extension bars, said sleeve removably fitting about said extension bars in non-rotatable sliding relation and each being of durable material which resists chipping when slipped on and off said extension bars.

4. An articulator for use in positioning a pair of dental models in oriented relation to each other, said articulator comprising a support including a base and an upper part in hinged connection, each having a positioning plate fixed thereto remote from said hinged connection, at least one extension bar affixed to each said positioning plate and protruding outwardly therefrom, a plurality of mounting sleeves to which dental models may be affixed, said sleeves each having a passage therein opening through one end which conforms to the shape of one of said extension bars, said sleeves removably fitting about said extension bars in non-rotatable sliding relation therewith, said sleeves each further having a flanged part about said opening to engage the positioning plate and thereby limit the extent of sliding of the sleeve on said extension bar, and said extension bars and passages in the sleeves which conform thereto being other than of round section, whereby dental models affixed to said sleeves may be conveniently slipped off said extension bars, and as conveniently slipped on the extension bars to again assume and maintain the same oriented relation to the parts of the articulator and each other.

5. An articulator according to claim 4 wherein the passages in the sleeves and extension bars are essentially of triangular shape.

References Cited in the file of this patent

UNITED STATES PATENTS

| | | |
|---|---|---|
| 400,713 | Slack et al. | Apr. 2, 1889 |
| 1,587,821 | Darcissac | June 8, 1926 |